United States Patent [19]

Overton

[11] Patent Number: 5,894,324

[45] Date of Patent: Apr. 13, 1999

[54] VIDEO ALIGNMENT USING A SELECTED PARTIAL PICTURE

[75] Inventor: Michael S. Overton, Beaverton, Oreg.

[73] Assignee: Tektronix, Inc., Wilsonville, Oreg.

[21] Appl. No.: 08/984,220

[22] Filed: Dec. 3, 1997

[51] Int. Cl.$^6$ .................................. H04N 17/00
[52] U.S. Cl. ........................... 348/181; 348/192
[58] Field of Search ........................ 348/181, 192, 348/180, 184, 194, 185; 382/209, 309

[56] References Cited

U.S. PATENT DOCUMENTS

| | | | |
|---|---|---|---|
| 5,208,666 | 5/1993 | Elkind et al. | 348/192 |
| 5,214,508 | 5/1993 | Stevens | 348/181 |
| 5,574,500 | 11/1996 | Hamada et al. | 348/180 |
| 5,654,751 | 8/1997 | Richards, III | 348/192 |
| 5,731,839 | 3/1998 | Panaro | 348/180 |
| 5,734,422 | 3/1998 | Maurer et al. | 348/180 |

OTHER PUBLICATIONS

"Digital Transport of One–Way Video Signals—Parameters for Objective Performance Assessment", American National Standards Institute, Inc. ANSI T1.801.03–yyyy, 72 pages undated.

*Primary Examiner*—Victor R. Kostak
*Attorney, Agent, or Firm*—Francis I. Gray

[57] ABSTRACT

Alignment of two video sequences, one being a reference video sequence and the other being a processed video sequence corresponding to the reference video sequence, is performed using selected partial pictures from the reference video sequence. The reference video sequence is evaluated for portions that have maximum information content spatially and/or temporally to select the partial pictures, and the location and size of the partial pictures are stored together with the reference video sequence. The processed video sequence is then initially aligned to the reference video sequence by first finding the locations of features from the partial pictures in the processed video sequence to provide a coarse misalignment error between the two video sequence, and then using a correlation algorithm with a scanning window based on the size of the partial pictures to refine the misalignment error. Once the processed video sequence is aligned with the reference video sequence by using the refined misalignment error, measurement of the differences between the two sequences may be obtained as an indication of the amount of degradation of the processed video sequence with respect to the reference video sequence.

4 Claims, 1 Drawing Sheet

VIDEO ALIGNMENT USING A SELECTED PARTIAL PICTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the measurement of the degradation in video sequences, and more particularly to a method of aligning two video sequences using selected partial pictures, one sequence being a reference sequence and the other being a processed sequence to be measured for degradation.

Conventional measurement of a video sequence has occurred in the analog, broadband domain using conventional waveform monitors and vectorscopes. As the video sequence moved into the digital domain, using a serial digital format, the resulting digital sequence has conventionally been converted into the analog, broadband domain for typical video measurements. However with the compression of the video sequence for storage or for transmission over lower bandwidth transmission media and subsequent decompression, the resulting decompressed video sequence is not an exact copy of the original, uncompressed video sequence. Other types of modifications to which the video sequence may be subjected include transmission through a CODEC, recording on tape, format conversion, satellite or broadcast transmission, composite encoding, etc. A measure of the amount of modification or degradation of the processed video sequence compared to a reference video sequence, the measure being related to the observability of flaws in the pictures by a human observer, is desired.

One such measurement instrument is disclosed in U.S. patent application Ser. No. 08/605,241 filed Feb. 12, 1996 by Bozidar Janko and David Fibush entitled "Programmable Instrument for Automatic Measurement of Compressed Video Quality" and is implemented in the PQA200 Picture Quality Analysis System manufactured by Tektronix, Inc. of Wilsonville, Oreg. The PQA200 compares a reference video sequence with a processed video sequence using a Just Noticeable Difference (JND) algorithm originally developed by David Sarnoff Research Laboratories, Inc. To assure that the pictures within the sequences to be compared are comparable and give consistent results from test to test, the comparable pictures are identified and aligned. The PQA200 uses identification and alignment markers that are added to the reference video sequence prior to processing and which are robust enough to survive the processing. By aligning the markers, consistent and meaningful measurements may be made. However these alignment markers, being within the active video portion of the pictures, are visible to an observer.

The American National Standards Institute (ANSI) standard T1.801.03-yyy, "Digital Transport of One-Way Video Signals—Parameters for Objective Performance Assessment", suggests using a correlation technique over the entire picture for each picture in the sequences being aligned. This is very compute intensive, with the resulting time required being such as to make realtime processes problematical.

What is desired is a method of video alignment between video sequences that is not visible to an observer and is capable of realtime processing.

BRIEF SUMMARY OF THE INVENTION

Accordingly the present invention provides for video alignment of two video sequences using selected partial pictures from a reference video sequence. The reference video sequence is evaluated for the portion of the pictures that have maximum information content spatially and/or temporally. The locations of the resulting selected partial pictures are stored with the associated reference video sequence. The processed video sequence, corresponding to the reference video sequence, is initially coarse aligned based upon the location of significant features within the selected partial pictures, such as telephone poles, with corresponding features in the processed pictures. Any resulting misalignment error is refined by using scanning windows, the sizes of which are based upon the size of the selected partial pictures, and an appropriate correlation algorithm. The resulting measure of the misalignment, i.e., the difference in pixel locations within the active picture area between the selected partial pictures and the processed pictures, is used to correct the alignment of the processed picture sequence relative to the reference picture sequence prior to comparison of the two video sequences for measurement of the degradation of the processed video sequence with respect to the reference video sequence.

The objects, advantages and other novel features of the present invention are apparent from the following detailed description when read in conjunction with the appended claims and attached drawing.

DETAILED DESCRIPTION OF THE INVENTION

Figure 1:
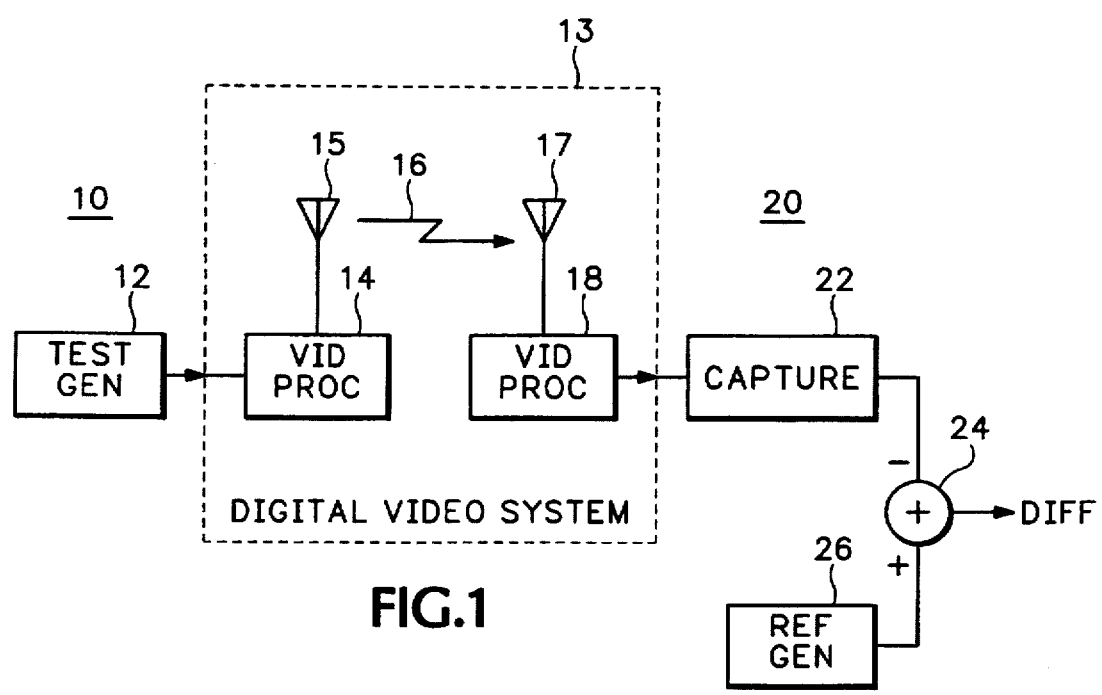
FIG. 1 is a block diagram view of a generic digital video system.

Referring now to FIG. 1 a test sequence generator 12, or other video sequence source such as tapes, disks, satellite feed, cable feed or the like, at a source location 10 generates a video sequence for transmission over a digital video system 13. The digital video system 13 may include a video processor 14, a transmission medium, such as a transmitting antenna 15, transmission path 16 and a receiving antenna 17, and a receive video processor 18. The transmission medium may be satellite or landline based, or may represent storage on tape or disk and subsequent retrieval. The processed video sequence at a receive location 20 is input to a capture device 22 and provided to a differencing algorithm 24, such as the JND algorithm to measure degradation of the processed video sequence. The other input to the differencing algorithm 24 is an identical video sequence, which is used as a reference video sequence, to that generated by the test sequence generator 12 at the source location 10, but generated by a reference generator 26 at the receive location 20. The resulting difference between the two video sequences is a measure of the modification or degradation of the original video sequence due to the processing which produced the processed video sequence.

The video sequence from the source location 10 has associated with it a sequence identifier so that the processed video sequence may be compared with the appropriate reference video sequence from the reference generator 26, as well as a picture identifier so that corresponding pictures are compared. As indicated above this may be provided by the markers as used in the PQA200 described above. The identifying marks may also be embedded in the active video portion of the video sequence, as disclosed in U.S. patent application Ser. No. 08/829,524 filed on Mar. 28, 1997 by Scott E. Zink and Daniel G. Baker entitled "Transparent Embedment of Data in a Video Signal" or in U.S. Pat. No. 4,969,041 issued Nov. 6, 1990 to William J. O'Grady and Robert J. Dubner entitled "Embedment of Data in a Video Signal." Likewise the reference video sequence at the receive location 20 may be transmitted from the source location 10 as described in U.S. Patent Application filed by Bozidar Janko entitled "Low Duty-Cycle Transport of Video Reference Images" rather than being generated at the receive location.

As part of the comparison process the pictures from the processed video sequence need to be aligned with the corresponding pictures of the reference video sequence to provide an accurate measure of the degradation of the processed video signal with respect to the reference video sequence. When predetermined reference video sequences are used for system testing, the reference video sequences may be pre-analyzed to determine the selected portions of the pictures that have appropriate information for both coarse and fine alignment, i.e., both prominent features such as telephone poles and high frequency features such as fence slats or a striped shirt. This selection of partial pictures based upon maximum information content for alignment may be made manually, and the locations of the selected partial pictures are stored with the reference video sequence, or it may be determined automatically, using an appropriate algorithm to detect the portions of the pictures with the maximum information content. The prominent features of the partial pictures, the locations of which are stored with the reference video sequence, are used to locate corresponding partial pictures in the processed video sequence as a coarse alignment of the processed video sequence with the reference video sequence. For finer alignment a window scan, where the windows are based on the sizes of the partial pictures, with an appropriate correlation algorithm may be used, as is well known in the art, to finely correlate the partial pictures of the reference video sequence with the corresponding partial pictures of the processed video sequence. Once the misalignment measure is achieved, i.e., the difference in pixel locations between the two partial pictures, the pictures of the processed video sequence may be adjusted at the input to the differencing algorithm 24 to align with the pictures of the reference video sequence to provide an accurate measure of the degradation of the processed video sequence with respect to the reference video sequence.

If the video sequence that is being used as the reference video sequence does not have sufficient temporal information to adequately measure the amount of degradation introduced by the digital video system 13 that may be caused by dropped or added frames, additional video information may be added to the video sequence, as indicated in the Zink/Baker Application referred to above, to provide such temporal information. The embedded data is also added to the reference video sequence generated at the receive location 20 to provide a modified reference video sequence corresponding to the transmitted reference video sequence with the added information as generated at the source location 10. Further using this partial picture technique and the embedment of data representing sequence and picture identification, a commercial or promotional spot may be used as the reference video sequence to evaluate picture degradation through distribution on an in-service basis.

Thus the present invention provides for video alignment of a processed video sequence with a reference video sequence using selected partial pictures from the reference video sequence, storing the location and size of the selected partial pictures with the reference video sequence, and aligning the processed video sequence with the reference video sequence using features of the partial pictures for coarse alignment and scanning windows with an appropriate correlation algorithm for fine alignment to determine the amount of misalignment, then aligning the processed picture sequence with the reference picture sequence accordingly prior to comparing the processed video sequence with the reference video sequence to obtain a measure of the degradation in the processed video sequence.

What is claimed is:

1. A method of aligning a processed video sequence with a corresponding reference video sequence comprising the steps of:

evaluating the reference video sequence to select partial pictures for measuring and correcting alignment of the processed video sequence with respect to the reference video sequence;

storing the locations of the selected partial pictures with the reference video sequence;

aligning the processed video sequence to the reference video sequence by comparing the stored selected partial pictures with the processed video sequence to determine a misalignment error; and correcting the processed video sequence for the misalignment error so that accurate measurement of the degradation of the processed video sequence with respect to the reference video sequence may be obtained.

2. The method as recited in claim 1 further comprising the step of embedding temporal information in the reference video sequence to provide sequence and picture identification.

3. The method as recited in claim 2 wherein the reference video sequence with embedded temporal information comprises an on-air video sequence.

4. The method as recited in claim 1 wherein the aligning step comprises the steps of:

locating a prominent feature in the partial pictures with a corresponding feature in the processed video sequence to produce a coarse misalignment error; and refining the coarse misalignment error using a correlation algorithm between the partial pictures and the processed video sequence to produce the misalignment error.

* * * * *